US006296294B1

United States Patent
Kohnle et al.

(10) Patent No.: US 6,296,294 B1
(45) Date of Patent: Oct. 2, 2001

(54) REAR VIEW MIRROR SUN VISOR ATTACHMENT

(76) Inventors: Kathleen F. Kohnle; Michael E. Bouches, both of 3708 W. Royal Palm Rd., Phoenix, AZ (US) 85051

( * ) Notice: Subject to any disclaimer, the term of this patent is extended or adjusted under 35 U.S.C. 154(b) by 0 days.

(21) Appl. No.: 09/288,136

(22) Filed: Apr. 8, 1999

(51) Int. Cl.[7] .................................................. B60J 3/00
(52) U.S. Cl. .............................................................. 296/97.9
(58) Field of Search ................................ 296/97.1, 97.7, 296/97.9, 97.11, 97.6, 97.5

(56) References Cited

U.S. PATENT DOCUMENTS

| | | | |
|---|---|---|---|
| D. 390,529 | * 2/1998 | Adams et al. | D12/401 |
| 2,163,495 | * 6/1939 | Levy | 296/97.5 |
| 2,549,395 | * 4/1951 | Short, Sr. | 296/97.5 |
| 2,620,222 | * 12/1952 | Beauchamp | 296/97.6 |
| 3,494,689 | * 2/1970 | McGlinchy | 251/298 |
| 3,957,377 | * 5/1976 | Kulikowski | 356/141.4 |
| 4,172,613 | * 10/1979 | Furando | 296/97.7 |
| 4,958,879 | * 9/1990 | Gillum | 296/97.6 |
| 5,042,867 | * 8/1991 | Crotty, III et al. | 296/97.8 |
| 5,575,523 | * 11/1996 | Keller | 296/97.7 |
| 5,598,883 | * 2/1997 | Platsis | 106/370.23 |
| 5,678,880 | * 10/1997 | Keller | 296/97.6 |
| 5,979,967 | * 11/1999 | Poulson | 296/97.9 |

* cited by examiner

Primary Examiner—D. Glenn Dayoan
Assistant Examiner—Patricia Engle

(57) ABSTRACT

A rear view mirror sun visor attachment for attaching to a windshield mounted rear view mirror of a vehicle to block sunlight shining through between the driver's side sun visor and the passenger's side sun visor. The rear view mirror sun visor attachment includes a panel having a pair of faces, a pair of opposite end edges, a pair of side edges extending between the end edges. The panel has a slot therethrough between the faces of the panel which extends from a first of the side edges of the panel towards a second of the side edges of the panel. The side portions of the slot each have a flap extending therefrom. The flaps are coupled together to couple the connect the side portions of the slot together.

9 Claims, 2 Drawing Sheets

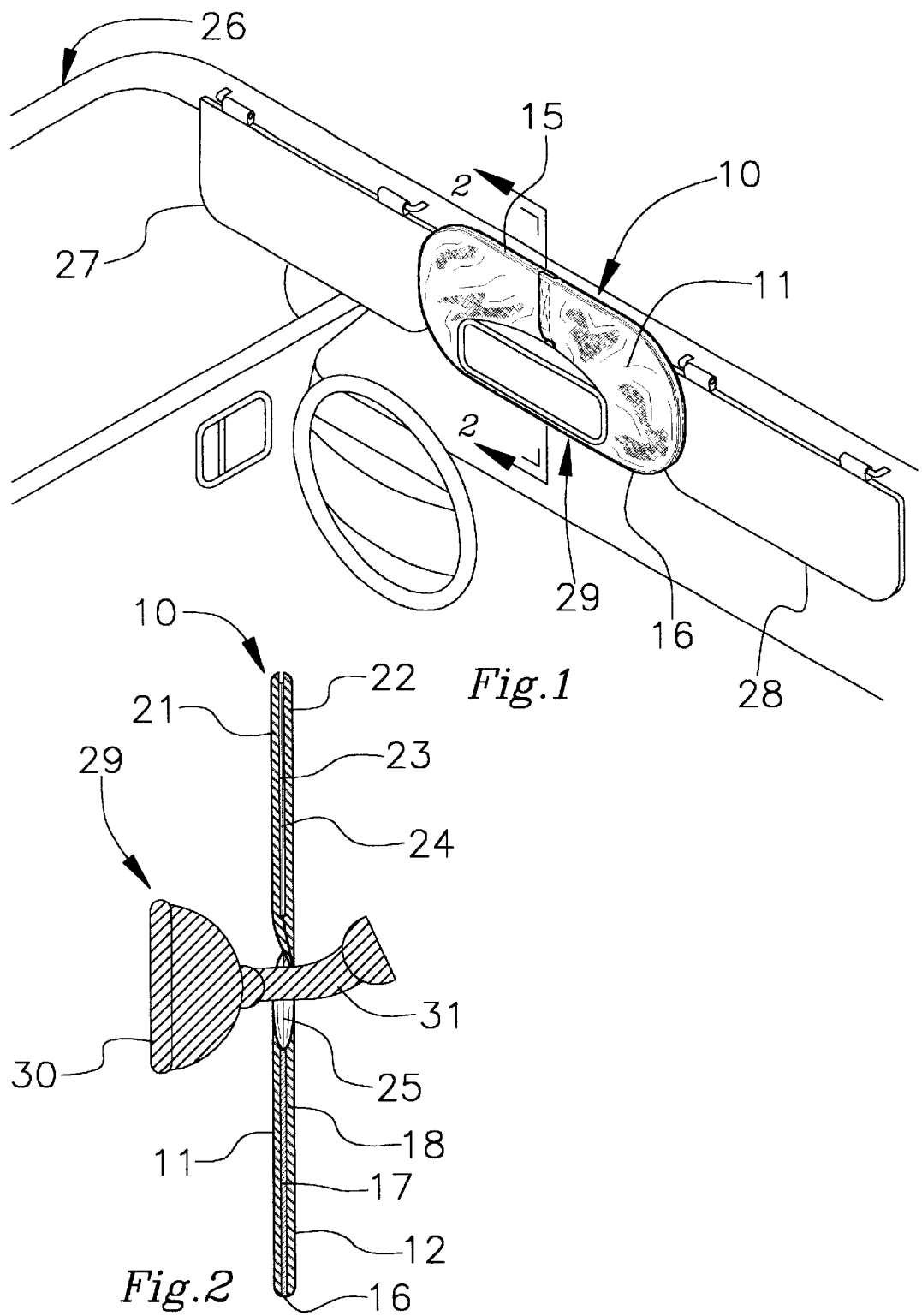

REAR VIEW MIRROR SUN VISOR ATTACHMENT

BACKGROUND OF THE INVENTION

1. Field of the Invention

The present invention relates to sun visor attachments and more particularly pertains to a new rear view mirror sun visor attachment for attaching to a windshield mounted rear view mirror of a vehicle to block sunlight shining through between the driver's side sun visor and the passenger's side sun visor.

2. Description of the Prior Art

The use of sun visor attachments is known in the prior art. More specifically, sun visor attachments heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,957,357 by Kulikowski; U.S. Pat. No. 3,494,689 by McGlinchy; U.S. Pat. No. 2,163,495 by Levy; U.S. Pat. No. 5,678,880 by Keller; U.S. Pat. No. 5,042,867 by Crotty, III et al.; and U.S. Pat. No. Des. 390,529 by Adams et al.

While these devices fulfill their respective, particular objectives and requirements, the aforementioned patents do not disclose a new rear view mirror sun visor attachment. The inventive device includes a panel having a pair of faces, a pair of opposite end edges, a pair of side edges extending between the end edges. The panel has a slot therethrough between the faces of the panel which extends from a first of the side edges of the panel towards a second of the side edges of the panel. The side portions of the slot each have a flap extending therefrom. The flaps are coupled together to couple the connect the side portions of the slot together.

In these respects, the rear view mirror sun visor attachment according to the present invention substantially departs from the conventional concepts and designs of the prior art, and in so doing provides an apparatus primarily developed for the purpose of attaching to a windshield mounted rear view mirror of a vehicle to block sunlight shining through between the driver's side sun visor and the passenger's side sun visor.

SUMMARY OF THE INVENTION

In view of the foregoing disadvantages inherent in the known types of sun visor attachments now present in the prior art, the present invention provides a new rear view mirror sun visor attachment construction wherein the same can be utilized for attaching to a windshield mounted rear view mirror of a vehicle to block sunlight shining through between the driver's side sun visor and the passenger's side sun visor.

The general purpose of the present invention, which will be described subsequently in greater detail, is to provide a new rear view mirror sun visor attachment apparatus and method which has many of the advantages of the sun visor attachments mentioned heretofore and many novel features that result in a new rear view mirror sun visor attachment which is not anticipated, rendered obvious, suggested, or even implied by any of the prior art sun visor attachments, either alone or in any combination thereof.

To attain this, the present invention generally comprises a panel having a pair of faces, a pair of opposite end edges, a pair of side edges extending between the end edges. The panel has a slot therethrough between the faces of the panel which extends from a first of the side edges of the panel towards a second of the side edges of the panel. The side portions of the slot each have a flap extending therefrom. The flaps are coupled together to couple the connect the side portions of the slot together.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new rear view mirror sun visor attachment apparatus and method which has many of the advantages of the sun visor attachments mentioned heretofore and many novel features that result in a new rear view mirror sun visor attachment which is not anticipated, rendered obvious, suggested, or even implied by any of the prior art sun visor attachments, either alone or in any combination thereof.

It is another object of the present invention to provide a new rear view mirror sun visor attachment which may be easily and efficiently manufactured and marketed.

It is a further object of the present invention to provide a new rear view mirror sun visor attachment which is of a durable and reliable construction.

An even further object of the present invention is to provide a new rear view mirror sun visor attachment which is susceptible of a low cost of manufacture with regard to both materials and labor, and which accordingly is then susceptible of low prices of sale to the consuming public, thereby making such rear view mirror sun visor attachment economically available to the buying public.

Still yet another object of the present invention is to provide a new rear view mirror sun visor attachment which provides in the apparatuses and methods of the prior art some of the advantages thereof, while simultaneously overcoming some of the disadvantages normally associated therewith.

Still another object of the present invention is to provide a new rear view mirror sun visor attachment for attaching to a windshield mounted rear view mirror of a vehicle to block sunlight shining through between the driver's side sun visor and the passenger's side sun visor.

Yet another object of the present invention is to provide a new rear view mirror sun visor attachment which includes a panel having a pair of faces, a pair of opposite end edges, a pair of side edges extending between the end edges. The panel has a slot therethrough between the faces of the panel which extends from a first of the side edges of the panel towards a second of the side edges of the panel. The side portions of the slot each have a flap extending therefrom. The flaps are coupled together to couple the connect the side portions of the slot together.

Still yet another object of the present invention is to provide a new rear view mirror sun visor attachment that helps prevent impairment of the driver's vision sunlight while driving for safer driving.

Even still another object of the present invention is to provide a new rear view mirror sun visor attachment that is quickly attachable to the rear view mirror and still permits a user to use the rear view mirror.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new rear view mirror sun visor attachment in use on the rear view mirror of a vehicle according to the present invention.

FIG. 2 is a schematic cross sectional view of the present invention taken from the line 2—2 of FIG. 1.

DESCRIPTION OF THE PREFERRED EMBODIMENT

Figure 3:
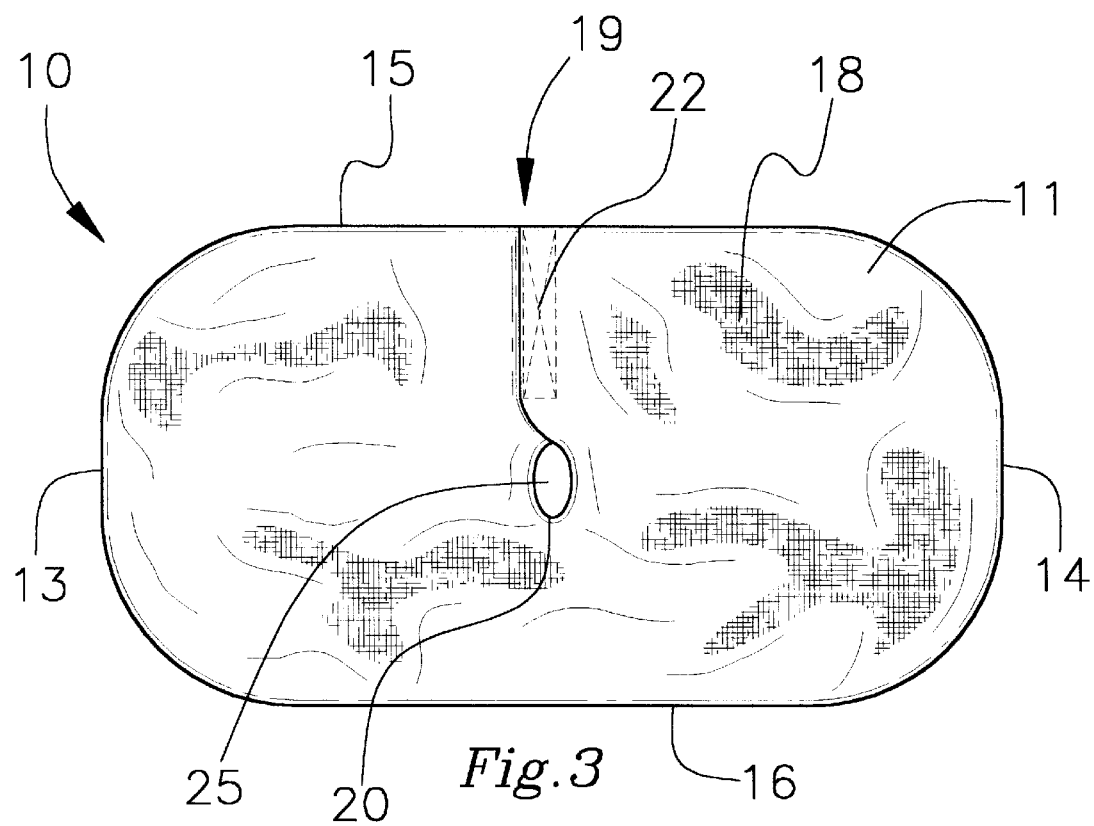
FIG. 3 is a schematic plan view of the present invention with the flaps overlapping each other.

With reference now to the drawings, and in particular to FIGS. 1 through 4 thereof, a new rear view mirror sun visor attachment embodying the principles and concepts of the present invention will be described.

As best illustrated in FIGS. 1 through 4, the rear view mirror sun visor attachment generally comprises a panel having a pair of faces, a pair of opposite end edges, a pair of side edges extending between the end edges. The panel has a slot therethrough between the faces of the panel which extends from a first of the side edges of the panel towards a second of the side edges of the panel. The side portions of the slot each have a flap extending therefrom. The flaps are coupled together to couple the connect the side portions of the slot together.

In closer detail, the sun visor attachment comprises a generally oblong panel 10 having has generally flat first and second faces 11,12, a pair of opposite end edges 13,14, a pair of side edges 15,16 extending between the end edges and a plurality of corners. The end edges of the panel are preferably extended generally parallel to one another and the side edges of the panel are preferably extended generally parallel to one another and generally perpendicular to the end edges of the panel. Preferably, the corners of the panel are rounded to prevent the corners of the panel from easily catching on adjacent surfaces in the vehicle. Ideally, the panel comprises a resiliently deformable foamed material inner core 17 enclosed in a cloth fabric material outer cover 18.

The panel has a thickness defined between the faces of the panel, a length defined between the end edges of the panel and a width defined between the side edges of the panel. Preferably, the length of the panel is greater than the width of the panel and the width of the panel is greater than the thickness of the panel. In an ideal illustrative embodiment, the length of the panel is about 14 inches, the width of the panel is about 10 inches, and the thickness of the panel is about ¼ inch.

The panel has a slot 19 therethrough between the faces of the panel and extending from a first of the side edges of the panel towards a second of the side edges of the panel. The slot of the panel is preferably extended generally parallel to the end edges of the panel and generally perpendicular to the side edges of the panel. Additionally, the slot is preferably positioned on the panel at a midline of the panel positioned generally equidistantly between end edges of the panel.

The slot has a generally U-shaped periphery comprising a spaced apart pair of generally straight side portions and an arcuate end portion 20 connecting the side portions of the slot together. The slot has a length defined from the first side edge of the panel to the end portion of the slot. Preferably, the length of the slot is about one-half the width of the panel.

Figure 4:
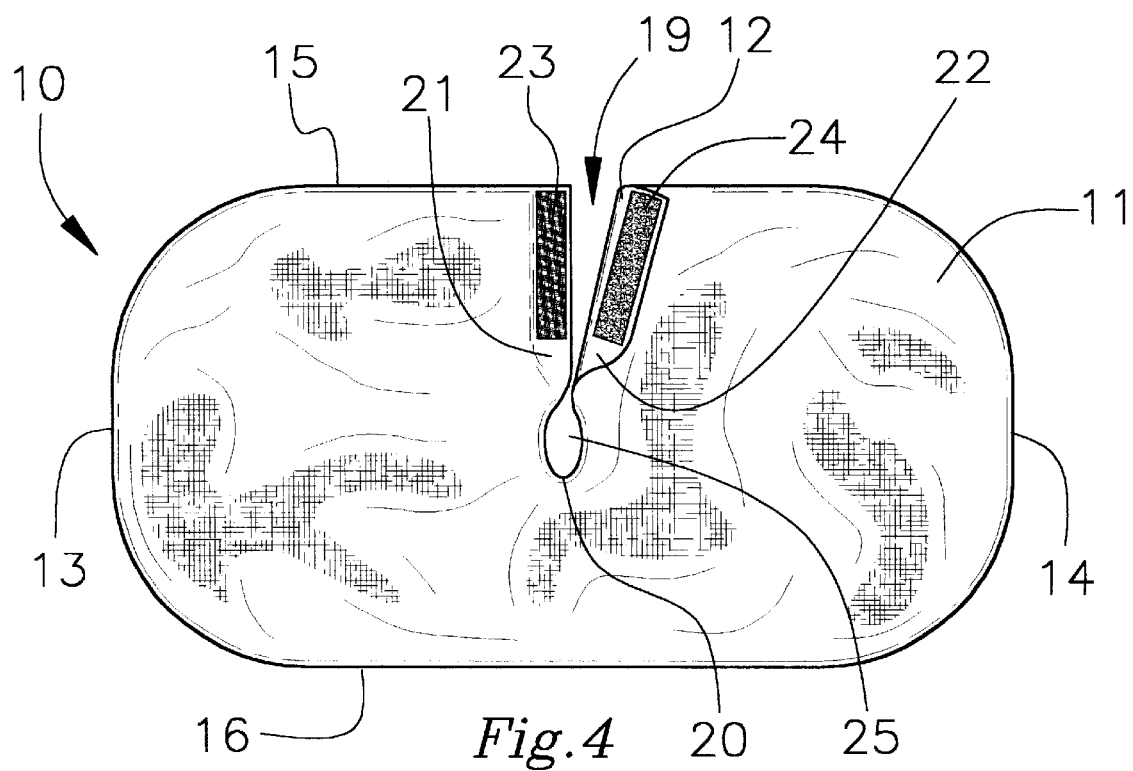
FIG. 4 is a schematic plan view of the present invention with one of the flaps folded back to reveal the complementary portions of the hook and loop fastener which attaches the flaps together.

The side portions of the slot each have a flap 21,22 extending therefrom. The flaps overlap one another and are coupled together to connect the side portions of the slot together. Preferably, a hook and loop fastener couples the flaps together. Ideally, the hook and loop fastener comprises a pair of complementary portions 23,24 detachably attachable to each other. Each of the complementary portions is preferably provided on a generally rectangular strip. As best illustrated in FIG. 4, a first of the complementary portions is provided on a first of the flaps and a second of the complementary portions is provided on a second of the flaps. The first complementary portion is positioned on a first of the faces of the panel and the second complementary portion is positioned on a second of the faces of the panel. The flaps each have a length defined between the first side edge of the panel and the arcute end portion of the slot.

Ideally, the lengths of the flaps are about equal to each other, the length of each of the flaps is less than length of the slot. This way, the flaps are spaced apart from the end portion of the slot to define a generally oblong or oval extension space 25 of the slot therebetween.

In use, the sun visor attachment is designed for installing in a vehicle 26 having a front windshield, a driver's side sun visor 27, a passenger's side sun visor 28 and a rear view mirror 29 mounted to the front windshield and interposed between the driver's side and passenger's side sun visors.

The rear view mirror has a generally rectangular reflecting portion 30 pivotally coupled to a stem portion 31 which connects the reflecting portion of the front windshield. The stem portion of the rear view mirror is extended through the extension space of the slot such that the panel is attached to the stem portion of the rear view mirror. The first face of the panel is preferably positioned towards the reflecting portion of the rear view mirror. A first of the end edges of the panel is positioned adjacent and preferably overlaps the closest end of the driver's side sun visor. A second of the end edges of the panel is positioned adjacent and also preferably overlaps the closest end of the passenger's side sun visor. The flaps are preferably positioned above stem portion of the rear view mirror although the flaps may also be positioned below the stem portion of the rear view mirror.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A sun visor attachment, comprising:
   a panel having a pair of faces, a pair of opposite end edges, a pair of side edges extending between said end edges;
   said panel having a slot therethrough between said faces of said panel and extending from a first of said side edges of said panel towards a second of said side edges of said panel;
   said slot having a periphery comprising a spaced apart pair of side portions and an end portion connecting said side portions of said slot together;
   said side portions of said slot each having a flap extending therefrom, said flaps overlapping one another; and
   said flaps being coupled together to couple said side portions of said slot together.

2. The sun visor attachment of claim 1, wherein said panel has a plurality of corners, wherein said corners of said panel are rounded.

3. The sun visor attachment of claim 1, wherein said end edges of said panel are extended generally parallel to one another, said side edges of said panel being extended generally parallel to one another and generally perpendicular to said end edges of said panel.

4. The sun visor attachment of claim 3, wherein said panel has a thickness defined between said faces of said panel, a length defined between said end edges of said panel and a width defined between said side edges of said panel, wherein said length of said panel is greater than said width of said panel, said width of said panel being greater than said thickness of said panel.

5. The sun visor attachment of claim 4, wherein said slot has a length defined from said first side edge of said panel, said length of said slot being about one-half said width of said panel.

6. The sun visor attachment of claim 1, wherein said slot being positioned on said panel at a midline of said panel positioned generally equidistantly between end edges of said panel.

7. The sun visor attachment of claim 1, wherein a hook and loop fastener couples said flaps together.

8. The sun visor attachment of claim 7, wherein said hook and loop fastener comprises a pair of complementary portions, a first of said complementary portions being provided on a first of said flaps, a second of said complementary portions being provided on a second of said flaps, said first complementary portion being positioned on a first of said faces of said panel, said second complementary portion being positioned on a second of said faces of said panel.

9. A sun visor attachment system, comprising:
   a sun visor attachment comprising:
   a generally oblong panel having first and second faces, a pair of opposite end edges, a pair of side edges extending between said end edges and a plurality of corners;
   said end edges of said panel being extended generally parallel to one another, said side edges of said panel being extended generally parallel to one another and generally perpendicular to said end edges of said panel;
   said panel having a thickness defined between said faces of said panel, a length defined between said end edges of said panel and a width defined between said side edges of said panel;
   wherein said length of said panel is greater than said width of said panel, said width of said panel being greater than said thickness of said panel;
   said corners of said panel being rounded;
   said panel having a slot therethrough between said faces of said panel and extending from a first of said side edges of said panel towards a second of said side edges of said panel;
   said slot of said panel being extended generally parallel to said end edges of said panel and generally perpendicular to said side edges of said panel;
   said slot being positioned on said panel at a midline of said panel positioned generally equidistantly between end edges of said panel;
   said slot having a generally U-shaped periphery comprising a spaced apart pair of side portions and an arcuate end portion connecting said side portions of said slot together;
   said slot having a length defined from said first side edge of said panel to said arcute portion of said slot;
   said length of said slot being about one-half said width of said panel;
   said side portions of said slot each having a flap extending therefrom, said flaps overlapping one another;
   said flaps being coupled together to couple said side portions of said slot together;
   wherein a hook and loop fastener couples said flaps together, said hook and loop fastener comprising a pair of complementary portions;
   a first of said complementary portions being provided on a first of said flaps, a second of said complementary portions being provided on a second of said flaps;
   said flaps each having a length defined between said first side edge of said panel and said arcute end portion, said lengths of said slot of said flaps being about equal to each other, said lengths of said flaps each being less than length of said slot;

said first complementary portion being positioned on a first of said faces of said panel, said second complementary portion being positioned on a second of said faces of said panel;

said flaps being spaced apart from said arcute end portion of said slot to define a extension space of said slot therebetween; and a vehicle having a front windshield, a driver's side sun visor, a passenger's side sun visor and a rear view mirror mounted to the front windshield and interposed between the driver's side and passenger's side sun visors;

the rear view mirror having a generally rectangular reflecting portion and a stem portion connecting the reflecting portion of the front windshield;

the stem portion of the rear view mirror being extended through said extension space of said slot such that said panel is attached to the stem portion of the rear view mirror;

said first face of said panel being positioned towards the reflecting portion of the rear view mirror;

a first of said end edges of said panel being positioned adjacent the driver's side sun visor;

a second of said end edges of said panel being positioned adjacent the passenger's side sun visor; and said flaps being positioned above stem portion of the rear view mirror.

* * * * *